(12) United States Patent
Hatakeyama

(10) Patent No.: US 9,747,829 B2
(45) Date of Patent: Aug. 29, 2017

(54) DISPLAY DEVICE

(71) Applicant: Panasonic Intellectual Property Management Co., Ltd., Osaka-shi, Osaka (JP)

(72) Inventor: Takeshi Hatakeyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 9 days.

(21) Appl. No.: 14/443,653

(22) PCT Filed: Nov. 13, 2013

(86) PCT No.: PCT/JP2013/006681
§ 371 (c)(1),
(2) Date: May 18, 2015

(87) PCT Pub. No.: WO2014/155446
PCT Pub. Date: Oct. 2, 2014

(65) Prior Publication Data
US 2015/0310790 A1    Oct. 29, 2015

(30) Foreign Application Priority Data

Mar. 27, 2013   (JP) ................. 2013-065575

(51) Int. Cl.
| | |
|---|---|
| G09G 3/20 | (2006.01) |
| G06F 1/32 | (2006.01) |
| G09G 3/30 | (2006.01) |
| G06F 3/02 | (2006.01) |
| G09G 3/22 | (2006.01) |
| B64D 11/00 | (2006.01) |

(52) U.S. Cl.
CPC ......... *G09G 3/2003* (2013.01); *G06F 1/3231* (2013.01); *G06F 3/0227* (2013.01);
(Continued)

(58) Field of Classification Search
CPC . G09G 2320/04–2320/048; G09G 2320/0233; G09G 2320/0295; G09G 3/3208; G06F 1/3231; G06F 3/1438; H01L 27/3211; G09F 9/33
See application file for complete search history.

(56) References Cited

U.S. PATENT DOCUMENTS

| | | | | |
|---|---|---|---|---|
| 5,640,297 A | * | 6/1997 | Labaze | B64D 11/0015 |
| | | | | 160/127 |
| 2003/0051179 A1 | * | 3/2003 | Tsirkel | G06F 1/3203 |
| | | | | 713/300 |

(Continued)

FOREIGN PATENT DOCUMENTS

| | | |
|---|---|---|
| JP | 2000-148118 A | 5/2000 |
| JP | 2003-263131 A | 9/2003 |

(Continued)

OTHER PUBLICATIONS

The Search Report from the corresponding International Patent Application No. PCT/JP2013/006681 issued on Feb. 18, 2014.

*Primary Examiner* — Sanjiv D Patel
(74) *Attorney, Agent, or Firm* — Shinjyu Global IP

(57) ABSTRACT

Variance in luminance deterioration in a display is suppressed. A display device in which a self-illuminating display element is used to display information comprises a display component in which are disposed a plurality of pixels made up of a plurality of colors of sub-pixels, and a controller for controlling the drive of the display component. The controller records an accumulated luminance for each sub-pixel, and calculates a luminance adjustment amount for each sub-pixel based on the difference between the accumulated luminance values. The controller also detects when no one is viewing the display device, produces a corrected image according to the luminance adjustment amount, and displays the corrected image on the display component while no one is viewing the display device.

13 Claims, 5 Drawing Sheets

(52) U.S. Cl.
CPC ............. *G09G 3/22* (2013.01); *G09G 3/30* (2013.01); *B64D 11/0015* (2013.01); *G09G 2320/0233* (2013.01); *G09G 2320/0285* (2013.01); *G09G 2320/046* (2013.01); *G09G 2320/048* (2013.01); *G09G 2360/16* (2013.01); *G09G 2380/12* (2013.01)

(56) References Cited

U.S. PATENT DOCUMENTS

| | | | |
|---|---|---|---|
| 2007/0046590 A1 | 3/2007 | Umezaki et al. | |
| 2007/0103411 A1* | 5/2007 | Cok | G09G 3/3216 345/82 |
| 2007/0146385 A1* | 6/2007 | Kienhoefer | G09G 3/22 345/593 |
| 2010/0014009 A1* | 1/2010 | Stavaeus | B64D 11/0015 348/837 |
| 2010/0103198 A1* | 4/2010 | Polak | G09G 3/30 345/690 |
| 2013/0110323 A1* | 5/2013 | Knight | G01S 13/93 701/3 |
| 2014/0168191 A1* | 6/2014 | Byeon | G09G 3/3233 345/212 |

FOREIGN PATENT DOCUMENTS

| | | |
|---|---|---|
| JP | 2003-295827 A | 10/2003 |
| JP | 2004-336646 A | 11/2004 |
| JP | 2007-086758 A | 4/2007 |

\* cited by examiner

DISPLAY DEVICE

PRIORITY

This is a National Stage Application under 35 U.S.C. §365 of International Application PCT/JP2013/006681, with an international filing date of Nov. 13, 2013, which claims priority to Japanese Patent Application No. 2013-065575 filed on Mar. 27, 2013. The entire disclosures of International Application PCT/JP2013/006681 and Japanese Patent Application No. 2013-065575 are hereby incorporated herein by reference.

TECHNICAL FIELD

Certain embodiments of the present invention relate to a display device, and more particularly relates to a display device capable of displaying moving and still pictures with a self-illuminating display.

BACKGROUND

Plasma displays and organic EL (electroluminescence) displays are used as display devices in personal computers and mobile terminals.

With a display featuring a self-illuminating display element, a characteristic of the display element is that the emission luminance decreases in proportion to the emission amount and time. This decrease in emission luminance is linked to deterioration of the emission characteristics, and as the deterioration in emission characteristics proceeds, the decrease in luminance also steadily proceeds even under the same drive conditions, so that the initial luminance can no longer be maintained. This decrease in emission luminance does not proceed evenly over the display, and there is variance in the deterioration in emission characteristics within a screen. One cause of this is that when the same image is continuously displayed, the display content is not uniform. A state in which this variance in luminance deterioration is visibly recognizable is known as "burn-in."

A number of ways to delay the occurrence of burn-in have been proposed (see, for example, Patent Literature 1 and 2).

PATENT LITERATURE

Patent Literature 1: Japanese Laid-Open Patent Application 2000-148118
Patent Literature 2: Japanese Laid-Open Patent Application 2003-263131

SUMMARY

To delay the occurrence of burn-in, it is necessary to reduce the variance in luminance deterioration in a display.

Certain embodiments of the present invention provide a display device that is effective at suppressing the variance in luminance deterioration in a display.

The display device disclosed herein is a display device in which a self-illuminating display element is used to display information, the display device comprising a display component in which a plurality of pixels made up of a plurality of colors of sub-pixels are disposed, and a controller for controlling the drive of the display component. The controller records an accumulated luminance value for each sub-pixel, calculates a luminance adjustment amount for each sub-pixel based on the difference between the accumulated luminance values, detects when no one is viewing the display device, produces a corrected image according to the luminance adjustment amount, and displays the corrected image on the display component while no one is viewing the display device.

The display device disclosed herein has the effect of reducing the variance in luminance deterioration in a display.

DETAILED DESCRIPTION

Embodiments will now be described in detail through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the patent claims.

Unless otherwise specified, labels, symbols, and numerals that are the same in the description indicate the same constituent elements. Also, unless otherwise specified, constituent elements that are not essential to the present invention are not depicted.

Embodiments

1-1. Configuration of Display Device 1

The display device 1 pertaining to an embodiment of the present invention will now be described by giving an example in which it is installed in the passenger section of an aircraft (a means of transport). The display device 1 produces and displays a specific corrected image for reducing the variance in luminance deterioration of a display during a period in which no one is using the display.

Figure 1:
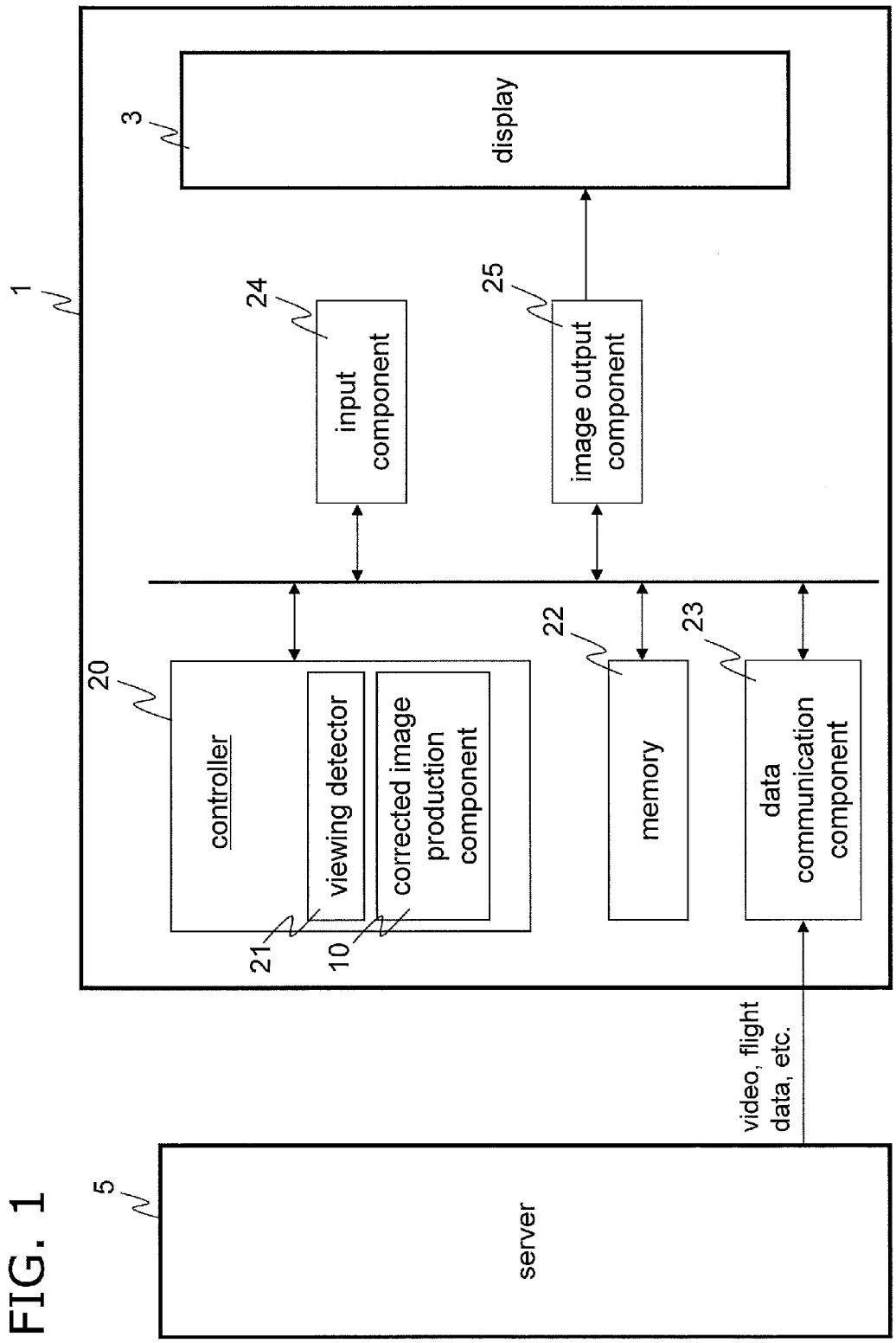
FIG. 1 is a simplified configuration diagram of the display device pertaining to an embodiment.

FIG. 1 is a simplified diagram of the overall configuration of the display device 1 (an example of a display device). The display device 1 is a terminal display device installed at each seat in an aircraft, and receives and displays data (video content, flight information, etc.) from a server 5 included in an aviation system, via a cable or the like.

The display device 1 comprises, for example, a controller 20 (an example of a controller), a memory 22, a data communication component 23, an input component 24, an image output component 25, and a display 3 (an example of a display component).

The controller 20 is constituted by a CPU or the like, and controls the memory 22, the data communication component 23, the input component 24, and the image output component 25. The controller 20 also controls the drive of the display 3.

The memory 22 holds various kinds of data processed by the controller 20. The data communication component 23 is a communication interface that sends information produced by the controller 20 through a cable or the like installed in the aircraft to the server 5, or receives information from the server 5. The input component 24 is an input means such as a button, a keyboard, a mouse, a touch panel provided to the display 3, or the like, and sends information inputted by user manipulation to the controller 20.

The display 3 makes use of a self-illuminating display element such as a plasma display or an organic EL display. The display 3 has a display area made up of a plurality of pixels arranged in a regular pattern vertically and horizontally. Each pixel comprises three sub-pixels, and these sub-pixels are a combination of light emitting elements that emit colors of red, green, and blue.

Figure 2:
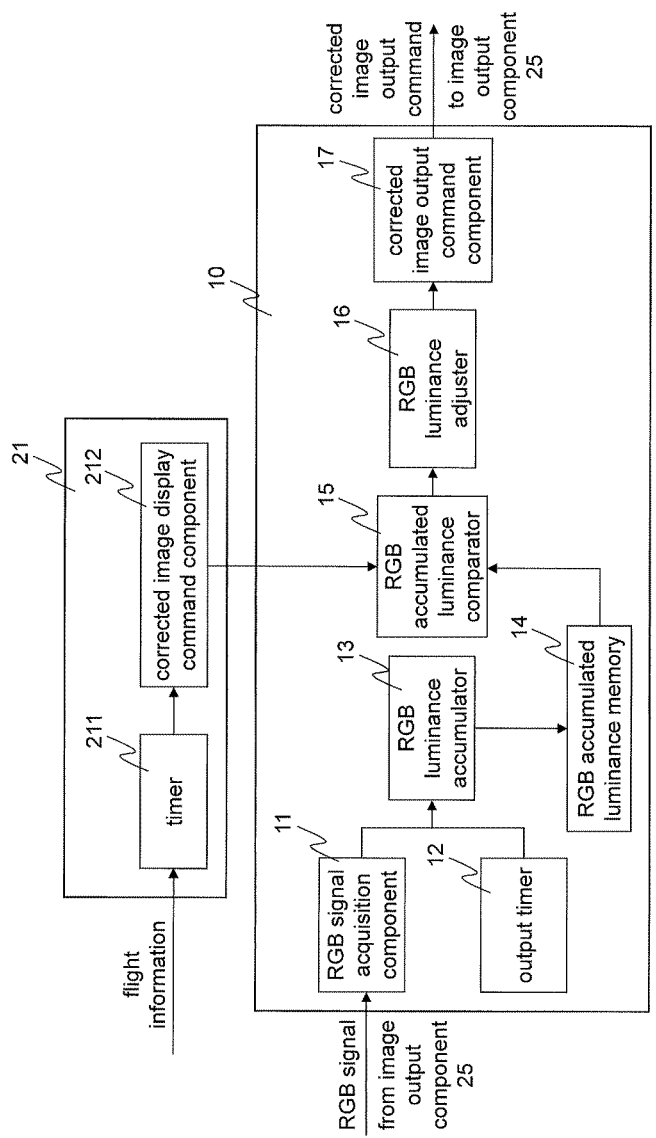
FIG. 2 is a functional block diagram of a display device.

The controller 20 executes the functions of a viewing detector 21 and a corrected image production component 10 according to a specific program. The functions executed by the controller 20 of the display device 1 will now be described through reference to FIG. 2.

1-1-1. Configuration of Viewing Detector 21

The viewing detector 21 has a timer 211 and a corrected image display command component 212. The timer 211 detects when no one is viewing on the basis of flight information acquired from the server 5 and its own time information. The "time when no one is viewing" here is before the start of a flight of the aircraft in question, at the end of a flight, etc.

The corrected image display command component 212 commands the corrected image production component 10 to display a corrected image when the timer 211 has detected the end of an aircraft flight or that it is before the start of an aircraft flight, for example.

The function of the corrected image production component 10 will now be described.

1-1-2. Configuration of Corrected Image Production Component 10

The corrected image production component 10 has an RGB signal acquisition component 11, an output timer 12, an RGB luminance accumulator 13, an RGB accumulated luminance memory 14, an RGB accumulated luminance comparator 15, an RGB luminance adjuster 16, and a corrected image output command component 17.

The RGB signal acquisition component 11 acquires an RGB signal outputted by the image output component 25 to the display 3. More specifically, it acquires luminance values for each of the three sub-pixels (RGB) that make up each pixel of the display 3.

The output timer 12 keeps track of the output time of each sub-pixel for the signal outputted by the image output component 25.

The RGB luminance accumulator 13 accumulates the luminance outputted by the sub-pixels (such as luminance× output time) on the basis of the luminance of the signal acquired by the RGB signal acquisition component 11 and the output time of each sub-pixel, and calculates an accumulated luminance value (an example of accumulated luminance value).

The RGB accumulated luminance memory 14 stores accumulated luminance values calculated by the RGB luminance accumulator 13. The RGB accumulated luminance memory 14 may be provided to part of a separately provided memory (such as the memory 22) or the like.

The RGB accumulated luminance comparator 15 calculates a maximum accumulated luminance value by comparing the accumulated luminance values for the RGB sub-pixels of all pixels, in response to a command from the viewing detector 21.

The RGB luminance adjuster 16 calculates the difference between the maximum accumulated luminance value outputted by the RGB accumulated luminance comparator 15 and the accumulated luminance values for the various sub-pixels, and calculates adjusted luminance values for the various sub-pixels (an example of the luminance adjustment amount). This adjusted luminance value is, for example, the luminance (0 to 100%) with respect to a specific length of time. A "specific length of time" is a preset length of time that is within the time during which the display device 1 is operating and no one is viewing, for example.

The corrected image output command component 17 commands the image output component 25 to output a corrected image according to the adjusted luminance values of the sub-pixels calculated as above. The corrected image output command component 17 also stops the output of the corrected image when a specific length of time for outputting the corrected image (corrected image output time) has elapsed.

The RGB signal that results when the image output component 25 outputs a corrected image to the display 3 is acquired by the RGB signal acquisition component 11, and is reflected in the accumulated luminance value stored in the RGB accumulated luminance memory 14. Thus, the difference in accumulated luminance values between the sub-pixels of all the pixels is updated so as to be lessened.

1-2. Operation of Display Device 1

Figure 3:
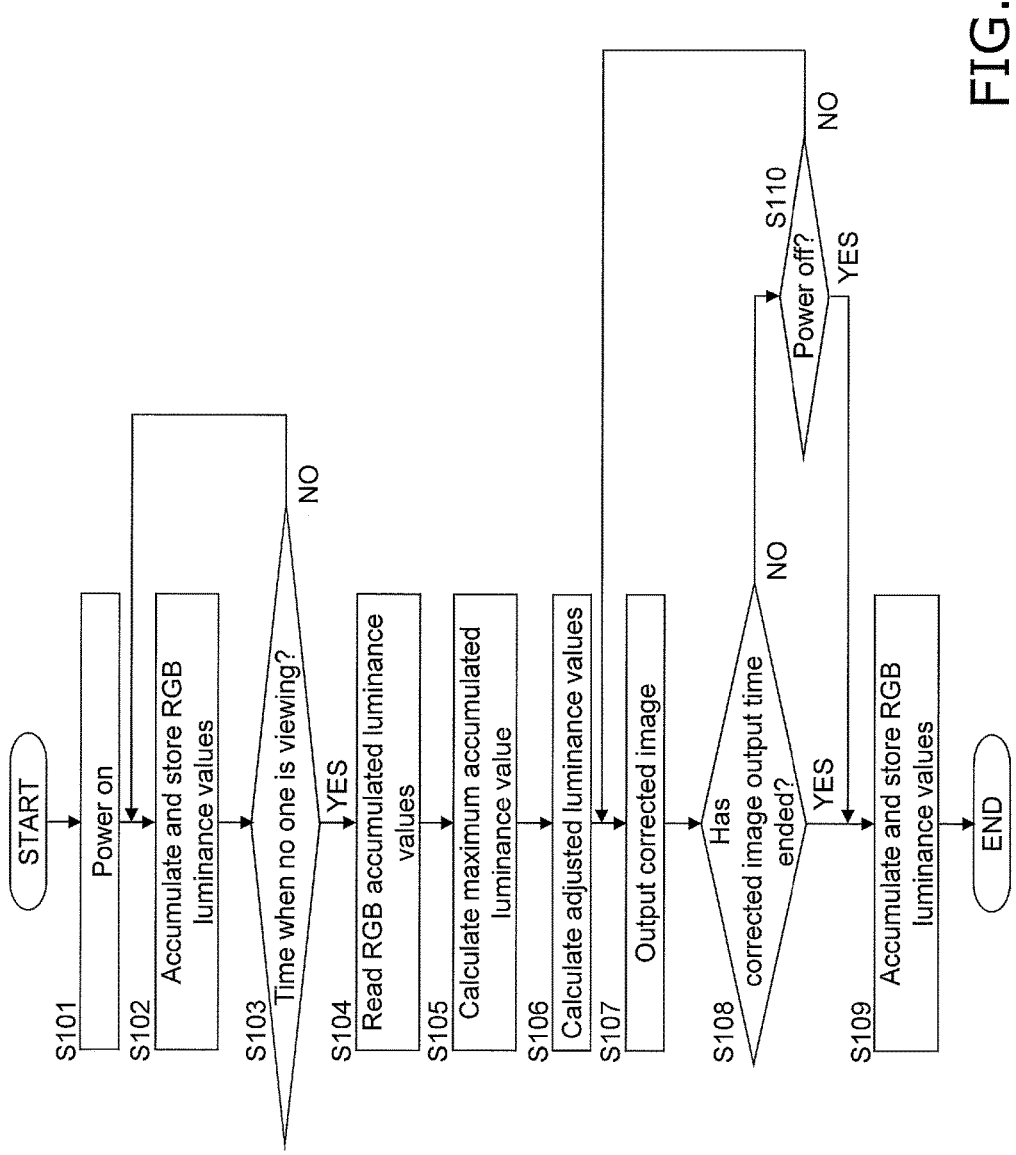
FIG. 3 is a flowchart of the operation of a display device.

The operation of the display device 1 will now be described through reference to FIG. 3.

Step S101: The power is turned on to the display device 1, and the display 3 becomes able to display information according to commands from the controller 20.

Step S102: The RGB signal acquisition component 11 of the corrected image production component 10 of the controller 20 acquires a signal quantity for each of the RGB sub-pixels of the display 3, via the image output component 25. At the same time, the output timer 12 measures the output time of the sub-pixels. The RGB luminance accumulator 13 accumulates the luminance outputted by the RGB sub-pixels on the basis of the luminance values for the sub-pixels and the output time of the sub-pixels (such as luminance×output time), and stores this in the RGB accumulated luminance memory 14.

Step S103: If the viewing detector 21 detects that no one is viewing, the flow proceeds to step S104.

Step S104: The RGB accumulated luminance comparator 15 reads the accumulated luminance values for the sub-pixels in response to a command from the viewing detector 21.

Step S105: The RGB accumulated luminance comparator 15 determines the maximum value out of the accumulated luminance values for all of the RGB sub-pixels on the screen, and this is termed the maximum accumulated luminance value.

Step S106: The RGB luminance adjuster 16 calculates the difference between the calculated maximum accumulated luminance value and the accumulated luminance values for the sub-pixels, and this difference is termed the adjusted luminance value for the sub-pixels. This adjusted luminance value is the luminance (0 to 100%) with respect to a specific time, for example.

Step S107: The corrected image output command component 17 commands the image output component 25 to output a corrected image according to the adjusted luminance values for all of the RGB sub-pixels calculated as above.

Step S108: If the corrected image output time has ended, the corrected image output command component 17 ends its processing, and the flow proceeds to step S109.

Step S109: Just as in step S102, for the corrected image outputted via the image output component 25, the luminance outputted by the RGB sub-pixels is accumulated (such as luminance×output time) on the basis of the output times of the sub-pixels and the luminance values for the sub-pixels, and this is stored in the RGB accumulated luminance memory 14.

Step S110: If the power is switched OFF before the corrected image output time has ended, processing is ended, so the flow proceeds to step S109.

The above operation flow is just an example, and the procedure and number of steps thereof are not limited to what was given above.

Figure 4:
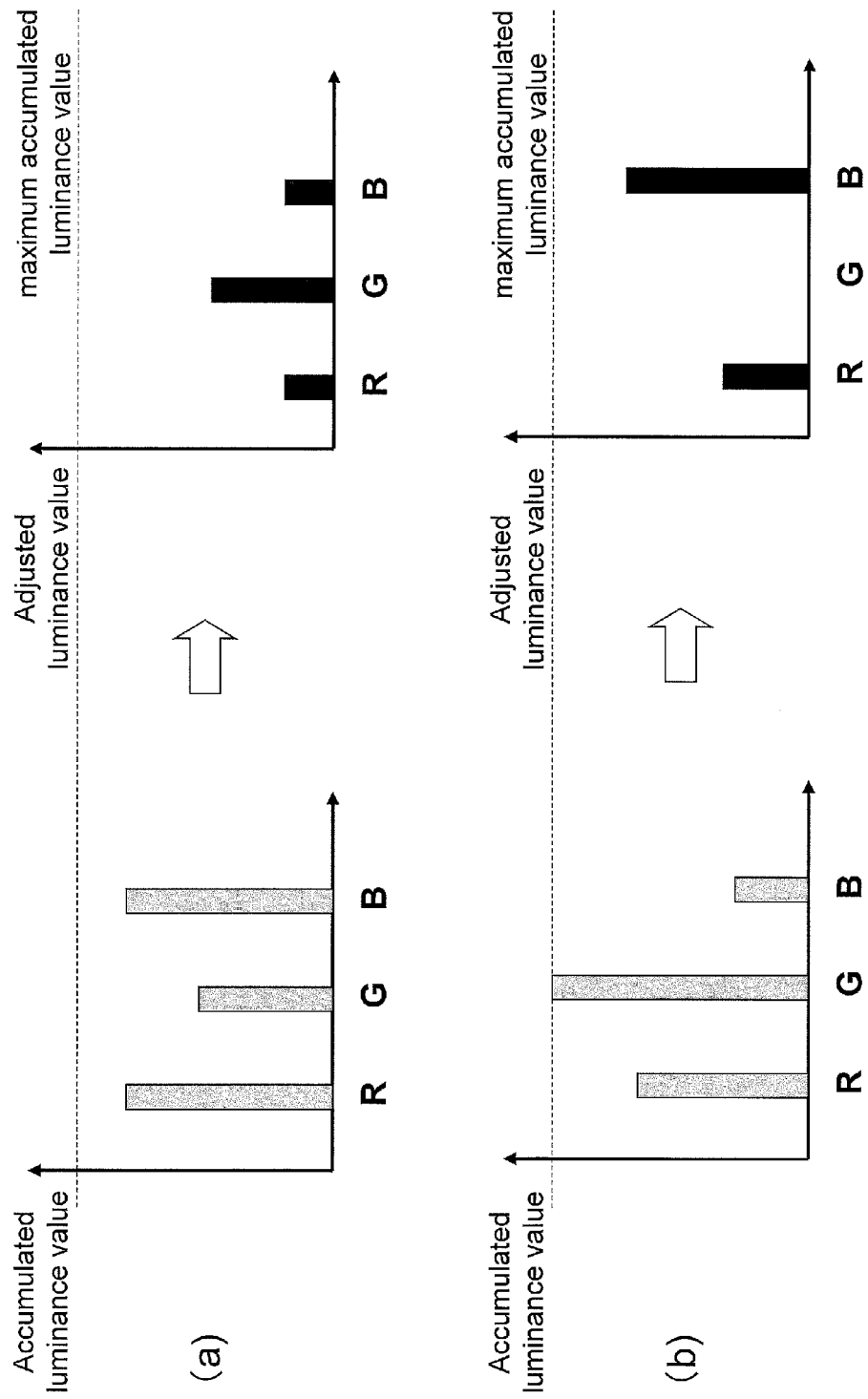
FIG. 4 is a diagram illustrating an adjusted luminance value for producing a corrected image.

FIG. 4 is a diagram illustrating an adjusted luminance value calculated by the display device 1.

The left side in FIG. 4a shows the accumulated luminance values for the RGB sub-pixels in a given pixel. If we let the maximum accumulated luminance value calculated by the display device 1 be the value indicated by the dotted line, the difference from the accumulated luminance values for the RGB sub-pixels in that pixel is calculated. As a result, as shown on the right side in FIG. 4a, an adjusted luminance value corresponding to the difference between the maximum accumulated luminance value and the accumulated luminance value for each sub-pixel is outputted as a corrected image.

The left side in FIG. 4b shows the accumulated luminance values for the RGB sub-pixels in a given pixel. In this pixel, the G sub-pixel has the maximum accumulated luminance value. Thus, as shown on the right side in FIG. 4b, an adjusted luminance value corresponding to the difference from the maximum accumulated luminance value is calculated for the R sub-pixel and the B sub-pixel, and the corrected image is outputted so that the adjusted luminance value for the G sub-pixel will be zero.

1-3. Effect, Etc.

With the above embodiment, the display device 1 calculates the accumulated luminance values for the sub-pixels, and outputs a corrected image according to the adjusted luminance value corresponding the difference between the maximum accumulated luminance value and the accumulated luminance value for all of the pixels, so the accumulated luminance of the pixels can be made more uniform. As a result, there is less variance in the deterioration of the emission characteristics in the pixels, the onset of so-called "burn-in" on the display is delayed, and the quality of the screen can be maintained.

With the above embodiment, since a corrected image is outputted after detecting that no one is viewing, variance in the deterioration of emission characteristics can be reduced without affecting normal viewing.

With the above embodiment, the RGB signal resulting from the output of a corrected image is acquired by the RGB signal acquisition component 11. Thus, the accumulated luminance values stored in the RGB accumulated luminance memory 14 are constantly being updated by the image output used for viewing and the output of the corrected image, so the uniformity of the accumulated luminance of the sub-pixels can be actively increased.

1-4. Modification Examples

In the above embodiment, the adjusted luminance value was found from the difference between the maximum accumulated luminance value and the accumulated luminance values of the sub-pixels, but this is not the only option.

Figure 5:
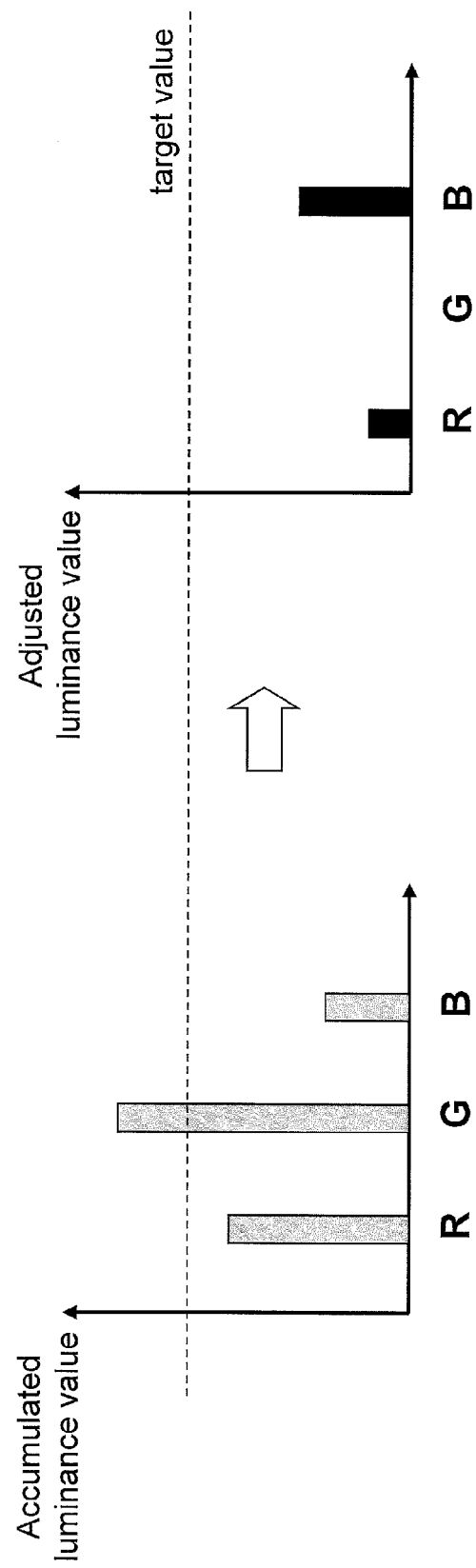
FIG. 5 is a diagram illustrating an adjusted luminance value pertaining to a modification example.

FIG. 5 shows a modification example of the calculation of the adjusted luminance value with the above-mentioned display device 1. In the example shown in this drawing, the RGB accumulated luminance comparator 15 sets a predetermined target value (such as an average accumulated luminance value acquired in advance), and the RGB luminance adjuster 16 uses the difference between this target value and the accumulated luminance values of the sub-pixels as an adjusted luminance value. In the pixel example shown in FIG. 5, The accumulated luminance value of the G sub-pixel has exceeded the target value, and the accumulated luminance values of the R sub-pixel and the B sub-pixel are too low. Thus, as shown on the right side in FIG. 5, the difference between the target value and the accumulated luminance values for the R sub-pixel and the B sub-pixel is calculated as an adjusted luminance value, and the corrected image is outputted so that the G sub-pixel will be zero.

The G sub-pixel that has exceeded the target value may, for example, be reflected in the accumulated luminance values in the RGB accumulated luminance memory, with the exceeded difference given as a negative value.

OTHER EMBODIMENTS

An embodiment of the present invention was described above, but the specific configuration of the present invention is not limited to or by the above embodiment, and various modifications are possible without departing from the gist of the invention. For instance, the following modifications are possible.

(1)

With the display device 1 pertaining to the above embodiment, the RGB luminance adjuster 16 calculated the luminance (0 to 100%) with respect to a specific length of time as the adjusted luminance value, but this is not the only option. The RGB luminance adjuster 16 may instead use the emission time (an example of the luminance adjustment amount) when the luminance level is held constant (at 100%, for example). In this case, the corrected image output command component 17 outputs a corrected image while controlling the emission times of the sub-pixels.

(2)

In the above embodiment, a threshold may be provided for the difference between the maximum accumulated luminance value and the accumulated luminance values of the sub-pixel. For example, in step S106 in FIG. 3, if the difference is less than a specific value, it may be concluded that there is no difference, and the adjusted luminance value set at zero.

(3)

In the above embodiment, an example was given in which the display device 1 was a terminal display device that was installed in an aircraft and connected by wire to the server 5, but this is not the only option. For example, it may be a wireless communication device (a smart phone, tablet terminal, etc.) that can be connected wirelessly via an access point installed in an aircraft, and has a display.

Also, the above embodiment, an example was given in which the display device 1 was applied to an aircraft, but this is not the only option, and it may instead be a communication terminal that is used in buildings or outdoors.

The display device 1 can also be applied to plasma displays, organic EL displays, and other such television sets and the like that have a display and make use of a self-illuminating display element.

(4)

In the above embodiment, the output of the corrected image was performed outside of the viewing time by acquiring the viewing time of the display device 1 from flight information in advance, but this is not the only option.

For example, flight altitude information may be acquired from flight information, and a corrected image outputted in response to the detection that the aircraft is under a specific altitude (that is, when the aircraft is taking off or landing and the display device 1 cannot be used).

Alternatively, the display device 1 may be provided with a pyroelectric sensor, a seat occupancy sensor, or another such sensor that detects the presence of a human, and the corrected image outputted when no one is detected for at least a specific length of time.

Alternatively, the corrected image may be outputted by operation of the input component 24.

Also, the corrected image may be outputted by detecting that the input component 24 has not been operated for at least a specific length of time.

INDUSTRIAL APPLICABILITY

Certain embodiments of the invention disclosed herein can be applied as a display device having a display and making use of a self-illuminating display element, such as a plasma display or an organic EL display.

The invention claimed is:

1. A display device in which a self-illuminating display element is used to display information, the display device comprising:
   a display component in which a plurality of pixels made up of a plurality of colors of sub-pixels are disposed; and
   a controller configured to control a drive of the display component, and
   records an accumulated luminance value for each sub-pixel,
   calculates a luminance adjustment amount for each sub-pixel based on a difference between the accumulated luminance values,
   detects when no one is viewing the display device,
   produces a corrected image according to the luminance adjustment amount,
   displays the corrected image on the display component while no one is viewing the display device,
   the display device is installed in a passenger section of an aircraft;
   and the controller detects that no one is viewing the display device on a basis of aircraft flight information indicating a time before a start of a flight of the aircraft and/or after an end of the flight of the aircraft.

2. The display device according to claim 1, wherein the controller detects that no one is viewing the display device on a basis of aircraft flight altitude information.

3. The display device according to claim 1, further comprising a sensor configured to sense a human, wherein the controller detects that no one is viewing the display device according to sensing by the sensor.

4. The display device according to claim 1, further comprising an input component configured to receive input from an interface, wherein the controller detects that no one is viewing the display device according to input to the input component.

5. The display device according to claim 1, wherein a difference between the accumulated luminance values is a difference with respect to a maximum value for each respective sub-pixel.

6. The display device according to claim 1, wherein the luminance adjustment amount is either a luminance of each sub-pixel with respect to a specific length of time or an emission duration of each sub-pixel with respect to a specific luminance.

7. The display device according to claim 1, wherein the pixels are each made up of three sub-pixels of R, G, and B.

8. The display device according to claim 1, wherein the controller detects that no one is viewing the display device on the basis of aircraft flight information specific to a flight of an aircraft in question.

9. The display device according to claim 1, wherein the controller detects that no one is viewing the display device on a basis of specific time information of an aircraft in question.

10. The display device according to claim 1, wherein the controller stops the production of the corrected image on the display component when a specific length of time for producing the corrected image has elapsed.

11. The display device according to claim 1, wherein the controller calculates the luminance amount for each sub-pixel based on a difference between a maximum accumulated luminance value and the accumulated luminance values of each sub-pixel.

12. A display device in which a self-illuminating display element is used to display information, the display device comprising:
   a display component in which a plurality of pixels made up of a plurality of colors of sub-pixels are disposed; and
   a controller configured to control a drive of the display component, and
   records an accumulated luminance value for each sub-pixel,
   calculates a luminance adjustment amount for each sub-pixel based on a difference between the accumulated luminance values,
   detects when no one is viewing the display device,
   produces a corrected image according to the luminance adjustment amount,
   displays the corrected image on the display component while no one is viewing the display device,
   the display device is installed in a passenger section of an aircraft;
   a server having aircraft flight information;
   and the controller detects that no one is viewing the display device on a basis of the aircraft flight information acquired from the server.

13. The display device of claim 12 further comprising:
   the aircraft flight information of the server indicates a time before a start of a flight of the aircraft and/or after an end of the flight of the aircraft.

* * * * *